US012381053B2

(12) United States Patent
Ahn et al.

(10) Patent No.: US 12,381,053 B2
(45) Date of Patent: Aug. 5, 2025

(54) VACUUM CIRCUIT BREAKER

(71) Applicant: LS ELECTRIC CO., LTD., Anyang-si (KR)

(72) Inventors: Kwanghyeon Ahn, Anyang-si (KR); Hyunwook Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 176 days.

(21) Appl. No.: 18/272,385

(22) PCT Filed: Jan. 13, 2022

(86) PCT No.: PCT/KR2022/000670
§ 371 (c)(1),
(2) Date: Jul. 14, 2023

(87) PCT Pub. No.: WO2022/211230
PCT Pub. Date: Oct. 6, 2022

(65) Prior Publication Data
US 2024/0079192 A1 Mar. 7, 2024

(30) Foreign Application Priority Data
Mar. 31, 2021 (KR) .......... 10-2021-0042102

(51) Int. Cl.
*H01H 33/664* (2006.01)
*H01H 33/668* (2006.01)

(52) U.S. Cl.
CPC ...... *H01H 33/668* (2013.01); *H01H 33/6643* (2013.01); *H01H 2239/06* (2013.01)

(58) Field of Classification Search
CPC ............ H01H 33/668; H01H 33/6643; H01H 33/6606; H01H 2033/6613; H01H 1/38;
(Continued)

(56) References Cited

U.S. PATENT DOCUMENTS 5,119,260 A * 6/1992 Huhse ............... H01H 33/666
361/93.6
7,910,852 B2 * 3/2011 Chen ............... H01H 33/6606
218/7
(Continued)

FOREIGN PATENT DOCUMENTS

CN 208296994 U 12/2018
CN 109036991 B 9/2019
(Continued)

OTHER PUBLICATIONS

Office Action for related Korean Application No. 10-2021-0042102; action dated Sep. 5, 2023; (4 pages).
(Continued)

*Primary Examiner* — William A Bolton
(74) *Attorney, Agent, or Firm* — K&L Gates LLP

(57) ABSTRACT

The present disclosure provides a vacuum circuit breaker which can measure and monitor temperature of a tulip contactor, the vacuum circuit breaker comprising: a conductive pole including a tulip contactor; and a temperature detecting sensor disposed adjacent to the tulip contactor, wherein the temperature detecting sensor comprises: a sensor body; a fixing band coupled to the sensor body and disposed to surround a part of the conductive pole; and a temperature measurement part which comes into contact with a specific point of the tulip contactor to measure the temperature of the specific point, wherein a sensor insertion hole for accommodating a part of the temperature measurement part is recessedly formed at one surface of the tulip contactor facing the sensor body.

12 Claims, 16 Drawing Sheets

(58) Field of Classification Search
CPC ............... H01H 11/04; H01H 11/0062; H01H 2011/0068; H01H 2239/06; H01H 73/04
USPC ......................................... 218/118, 120, 140
See application file for complete search history.

(56) References Cited

U.S. PATENT DOCUMENTS

| | | | |
|---|---|---|---|
| 10,249,459 B2* | 4/2019 | Yang | ................. H01H 9/52 |
| 10,741,338 B1* | 8/2020 | Wang | ................. H01H 1/38 |
| 2015/0139275 A1* | 5/2015 | Park | ................. G01K 13/00 374/152 |

FOREIGN PATENT DOCUMENTS

| | | |
|---|---|---|
| JP | 3135586 U | 8/2007 |
| KR | 100883042 B1 | 2/2009 |
| KR | 20150057107 A | 5/2015 |
| KR | 20160047883 A | 5/2016 |
| KR | 101773306 B1 | 8/2017 |
| KR | 102173320 B1 | 11/2020 |

OTHER PUBLICATIONS

International Search Report for related International Application No. PCT/KR2022/000670; action dated Oct. 6, 2022; (2 pages).
Written Opinion for related International Application No. PCT/KR2022/000670; action dated Oct. 6, 2022; (3 pages).

* cited by examiner

VACUUM CIRCUIT BREAKER

CROSS-REFERENCE TO RELATED APPLICATIONS

This application is the National Stage filing under 35 U.S.C. 371 of International Application No. PCT/KR2022/000670, filed on Jan. 13, 2022, which claims the benefit of earlier filing date and right of priority to Korea utility model Application No. 10-2021-0042102 filed on Mar. 31, 2021, the contents of which are all hereby incorporated by reference herein in their entirety.

FIELD

The present disclosure relates to a vacuum circuit breaker, and more particularly, to a vacuum circuit breaker capable of measuring and monitoring temperature of a tulip contactor.

BACKGROUND

A vacuum circuit breaker is a device that is provided to break a circuit when a fault current such as overcurrent, short circuit, or ground fault occurs on an extra-high voltage or high-voltage distribution line.

A vacuum circuit breaker may be switched to a closed or trip state. In the closed state, the vacuum circuit breaker is electrically connected to an external power source or a load. In the trip state, the vacuum circuit breaker is electrically disconnected from an external power source or a load.

The vacuum circuit breaker includes various components. As the vacuum circuit breaker operates, the components operate and heat is generated. In addition, even when an abnormal current is applied from the external power source, excessive heat may be generated from each of the components of the vacuum circuit breaker.

When the generated heat stays in the vacuum circuit breaker for a preset time or longer, each of the components of the vacuum circuit breaker may be damaged. Accordingly, the vacuum circuit breaker generally includes a temperature detecting sensor configured to measure external or internal temperature.

A heating value of the vacuum circuit breaker varies depending on portions of the vacuum circuit breaker. In this case, a damage caused by heating may occur to a portion in which the heating value is high. However, it is difficult to detect temperature of a specific point by using a vacuum circuit breaker in the related art.

This may have a disadvantageous effect on prevention of a thermal accident relevant to the vacuum circuit breaker. In addition, this may cause an unnecessary increase in cost and time for temperature detection performed by the vacuum circuit breaker.

Accordingly, development of a vacuum circuit breaker capable of measuring and monitoring temperature of a specific point in the vacuum circuit breaker in real time may be taken into account. Particularly, development of a vacuum circuit breaker capable of measuring and monitoring temperature of a tulip contactor in real time may be taken into account.

Korea Patent Registration No. KR 10-1773306 discloses a wireless temperature detecting device in a distribution panel. In detail, a wireless temperature detecting device installed in one of a tulip contactor, a main bus, or a cable terminal unit in a circuit breaker equipped in the distribution panel is disclosed.

This type of temperature detecting device is attached to a housing part in the tulip contactor. That is, the temperature detecting device is not directly attached to the tulip contactor. Accordingly, an accuracy of temperature measurement may be reduced.

Chinese Patent Registration No. CN 208,296,994 discloses a temperature sensor in a distribution panel. In detail, a temperature sensor positioned in a low-pressure distribution panel is disclosed.

However, this type of temperature sensor is also attached to outside of a circuit breaker, not directly to a contactor. Accordingly, an accuracy of the temperature sensor is insufficient, and excessive cost and time for temperature measurement may be needed.

PRIOR ART DOCUMENTS

Patent Documents (Patent document 1) Korea Patent Registration No. KR 10-1773306 (published on Aug. 31, 2017)
(Patent document 2) Chinese Patent Registration No. CN 208,296,994 (published on Dec. 28, 2018)

SUMMARY

Therefore, to obviate those problems, an aspect of the detailed description is to provide a vacuum circuit breaker capable of directly measuring temperature of a tulip contactor in each phase.

Another aspect of the detailed description is to provide a vacuum circuit breaker in which a damage to a temperature detecting sensor due to movement of a tulip contactor may be prevented.

Another aspect of the detailed description is to provide a vacuum circuit breaker capable of reducing cost and time needed for temperature detection.

Another aspect of the detailed description is to provide a vacuum circuit breaker including a plurality of temperature detecting sensors.

Another aspect of the detailed description is to provide a vacuum circuit breaker in which a temperature detecting sensor may not be electrically connected to, but insulated from outside of a conductive pole.

Solution to Problem

To achieve these and other advantages and in accordance with the purpose of the present disclosure, as embodied and broadly described herein, there is provided a vacuum circuit breaker including: a conductive pole including a tulip contactor electrically connected to an external power source or a load; and a temperature detecting sensor arranged adjacent to the tulip contactor, wherein the temperature detecting sensor includes: a sensor body having an input unit accommodated therein; a fixing band coupled to the sensor body and arranged to surround a part of the conductive pole; and a temperature measurement part which is in contact with a specific point of the tulip contactor and configured to measure temperature of the specific point, wherein a sensor insertion hole for accommodating a part of the temperature measurement part is recessedly provided in one surface of the tulip contactor facing the sensor body.

The tulip contactor may be provided to have a plate shape extending in one direction and include a plurality of tulip fingers arranged along a circumferential direction of a virtual circle, and at least one of the plurality of tulip fingers may be provided with the sensor insertion hole in one surface facing the sensor body.

The temperature detecting part may include: a connection line having one end coupled to the sensor body; and a target contact part accommodated in the sensor insertion hole and coupled to another end of the connection line arranged opposite to the one end of the connection line.

The target contact part may be provided to have a shape corresponding to the sensor insertion hole.

The connection line may be provided to include a conductive polymer material.

The target contact part may be provided in plurality, and the plurality of target contact parts may be coupled to different connection lines, respectively.

The temperature detecting sensor may include a power unit configured to provide a power source and equipped in the sensor body.

The fixing band may be provided to include a metal material, and the power unit may be electrically connected to the fixing band and receives, via the fixing band, a magnetic field generated from the tulip contactor to generate electrical energy.

The fixing band may pass through a band hole provided in the sensor body to be coupled to the sensor body.

Velcros may be provided on an outer circumference of the fixing band and one surface of the sensor body facing the fixing band, respectively, to be coupled to be engaged with each other.

The input unit may collect temperature data from the temperature measurement part, and the temperature detecting sensor may include a data processing unit configured to receive the temperature data from the input unit and organize the temperature data.

The temperature detecting sensor may include a communication unit configured to transmit, to outside, data organized by the data processing unit.

Among various effects of the present disclosure, effects that can be obtained through the solution to problems will be described as follows.

First, a temperature detecting sensor is directly attached to a tulip contactor. In detail, a temperature detecting sensor is directly attached to a tulip contactor in each phase.

Accordingly, temperature of the tulip contactor in each phase may be directly measured. In this case, different thermal sources of the vacuum circuit breaker may not be redundantly measured.

Thus, when compared to temperature measurement via a thermal imaging camera, accuracy of temperature data may be enhanced. Further, maintenance of the vacuum circuit breaker may be improved.

In addition, temperature of the tulip contactor in each phase may be easily measured and monitored in real time.

In addition, a sensor body of the temperature detecting sensor and a temperature measurement part are electrically connected to each other by a connection line.

Thus, the temperature detecting sensor may flexibly cope with movement of the tulip finger. Accordingly, a damage to the temperature detecting sensor due to movement of the tulip contactor may be prevented.

In addition, the temperature detecting sensor measures and monitors temperature of a specific point of the tulip contactor. Accordingly, temperature measurement of the whole vacuum circuit breaker is not separately needed.

Therefore, cost and time for temperature detection by the vacuum circuit breaker may be reduced. In addition, an additional device configured to store image data of a thermal imaging camera is not needed.

Additionally, a plurality of temperature detecting sensors may be included in one vacuum circuit breaker. That is, temperature of a plurality of specific points may be simultaneously measured.

Thus, a user may collect and check temperature of the tulip contactor in each phase. Accordingly, convenience of work for measuring and monitoring temperature of the vacuum circuit breaker may be enhanced.

In addition, the temperature detecting sensor is positioned in a housing part of a conductive pole. In detail, the temperature detecting sensor is arranged adjacent to a tulip finger of the conductive pole.

Thus, the temperature detecting sensor may not be electrically connected to, but insulated from outside of the conductive pole. Accordingly, occurrence of an abnormal current such as an overcurrent, etc. in the temperature detecting sensor may be prevented. Further, a damage to the temperature detecting sensor may be prevented.

DETAILED DESCRIPTION

Figure 1:
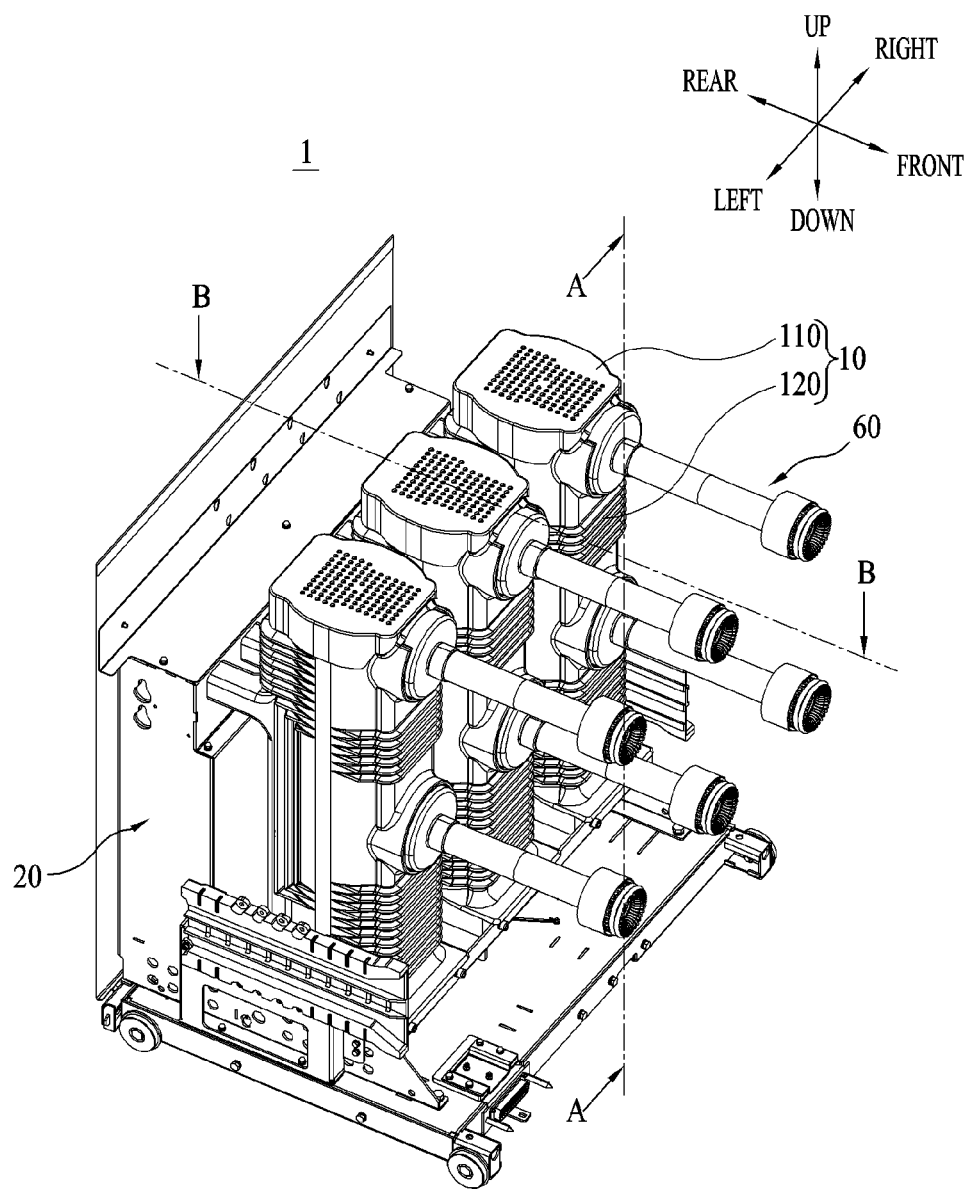
FIG. 1 a perspective view of a vacuum circuit breaker according to an embodiment of the present disclosure.
Figure 2:
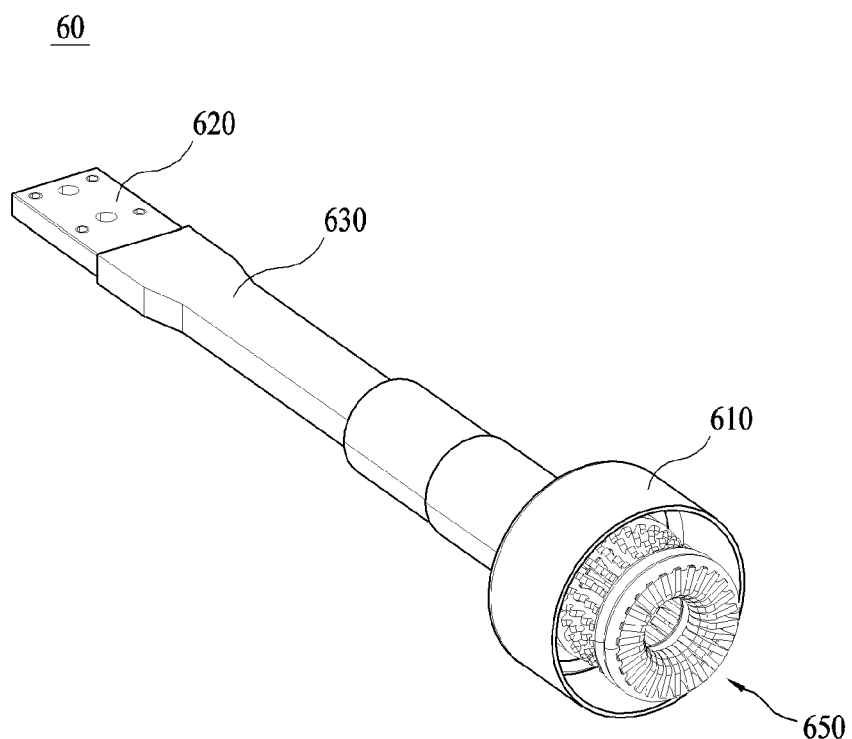
FIG. 2 is a perspective view of a conductive pole included in the vacuum circuit breaker of FIG. 1.
Figure 3:
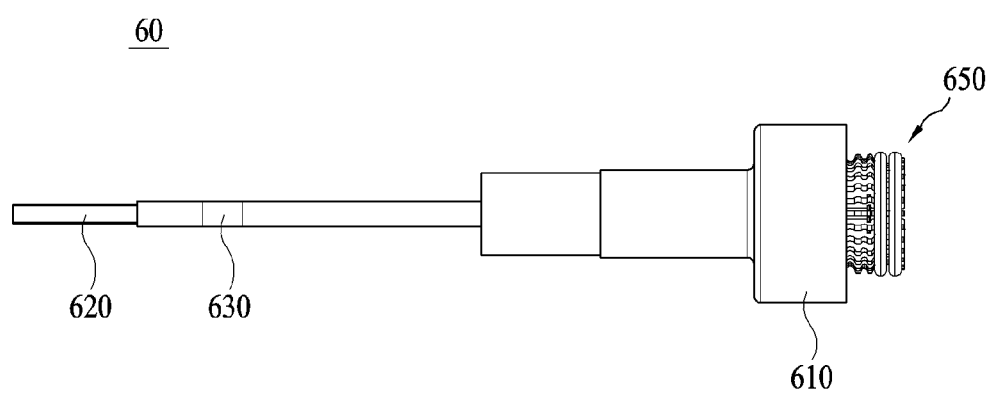
FIG. 3 is a side view of the conductive pole of FIG. 2.
Figure 4:
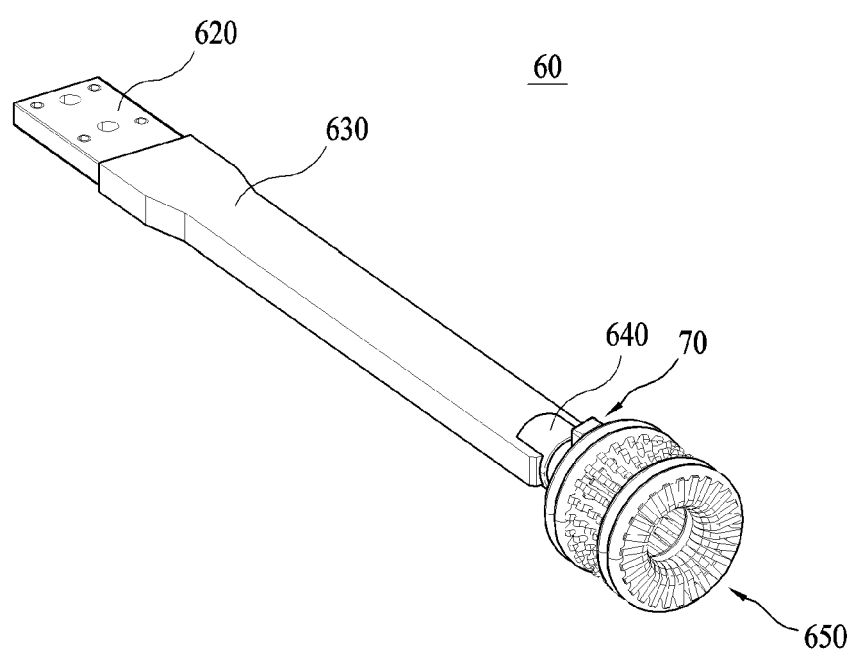
FIG. 4 is a perspective view of a plate part, a conductive pole terminal, a coupling member, and a tulip contactor, each included in the conductive pole of FIG. 2.
Figure 5:
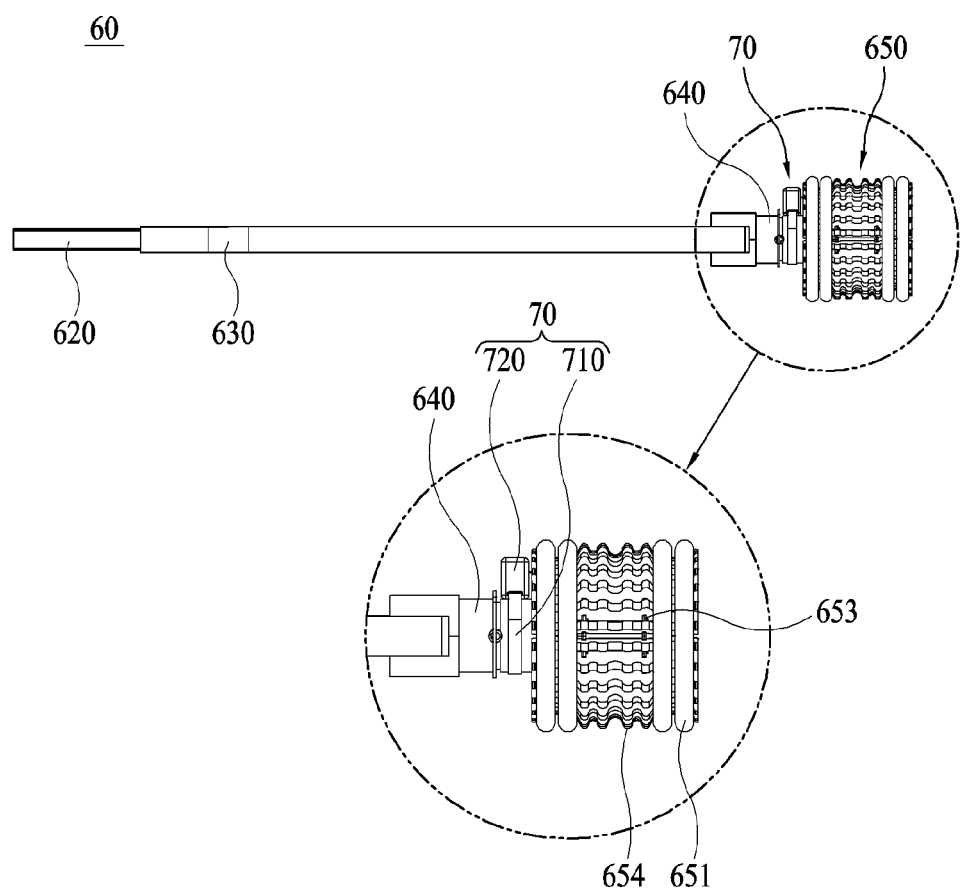
FIG. 5 is a side view of the plate part, the conductive pole terminal, the coupling member, and the tulip contactor, each shown in FIG. 4.
Figure 6:
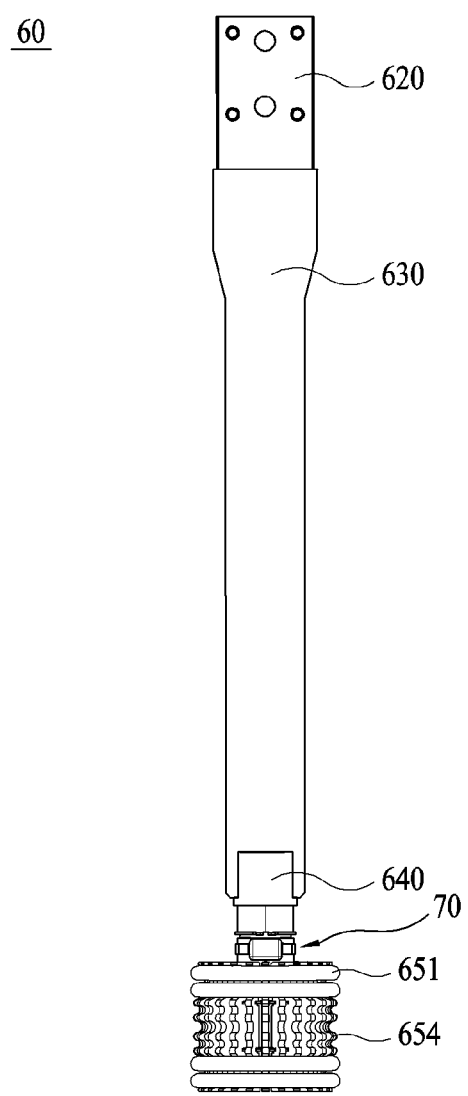
FIG. 6 is a plan view of the plate part, the conductive pole terminal, the coupling member, and the tulip contactor, each shown in FIG. 4.
Figure 7:
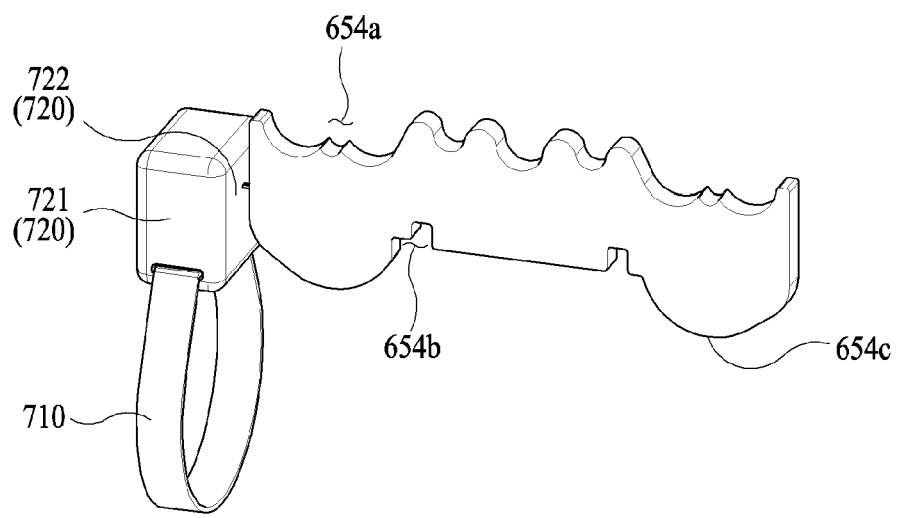
FIG. 7 is a perspective view of a tulip finger and a temperature detecting sensor both included in the vacuum circuit breaker of FIG. 1.
Figure 8:
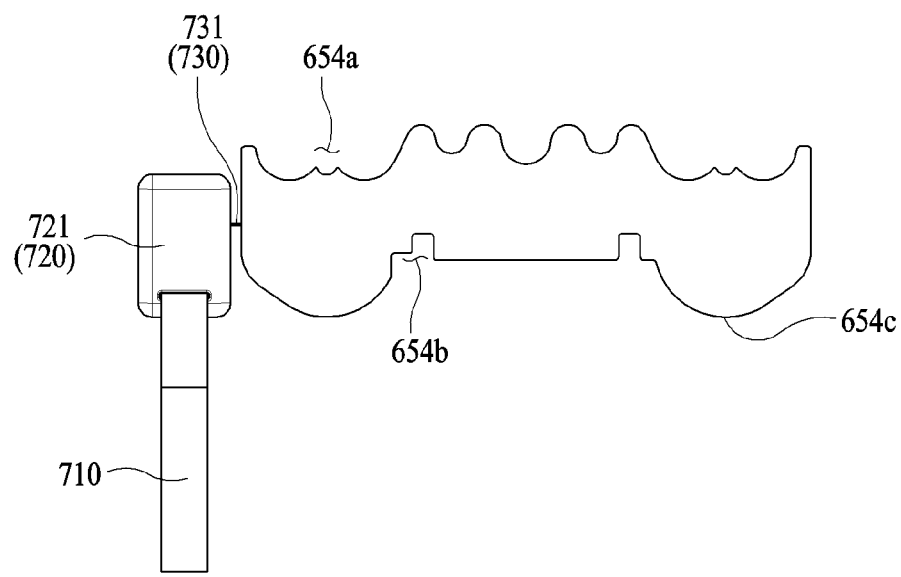
FIG. 8 is a side view of the tulip finger and the temperature detecting sensor both shown in FIG. 7.
Figure 9:
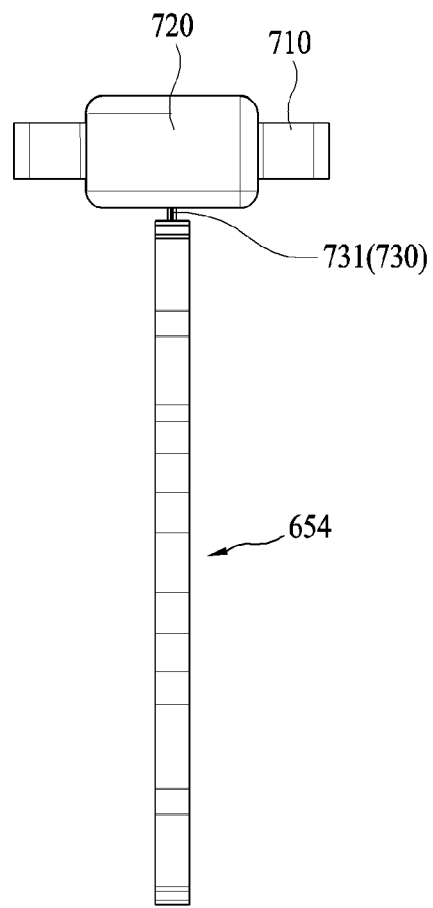
FIG. 9 is a plan view of the tulip finger and the temperature detecting sensor both shown in FIG. 7.
Figure 10:
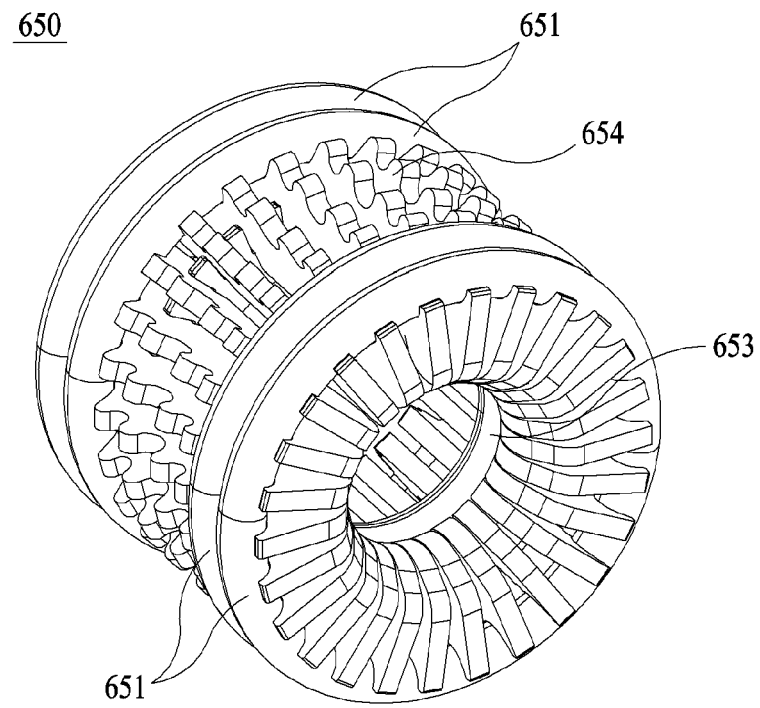
FIG. 10 is a perspective view of the tulip contactor included in the conductive pole of FIG. 2.
Figure 11:
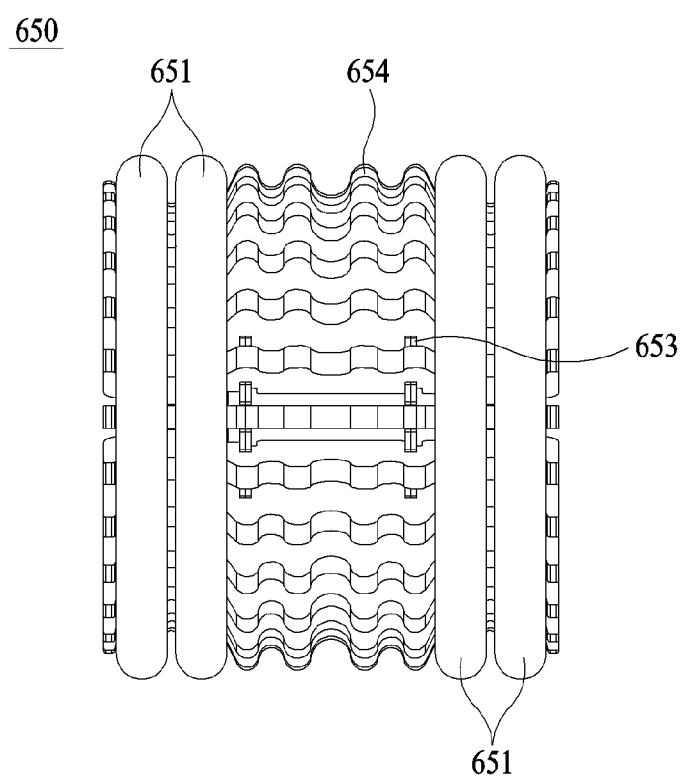
FIG. 11 is a side view of the tulip contactor of FIG. 10.
Figure 12:
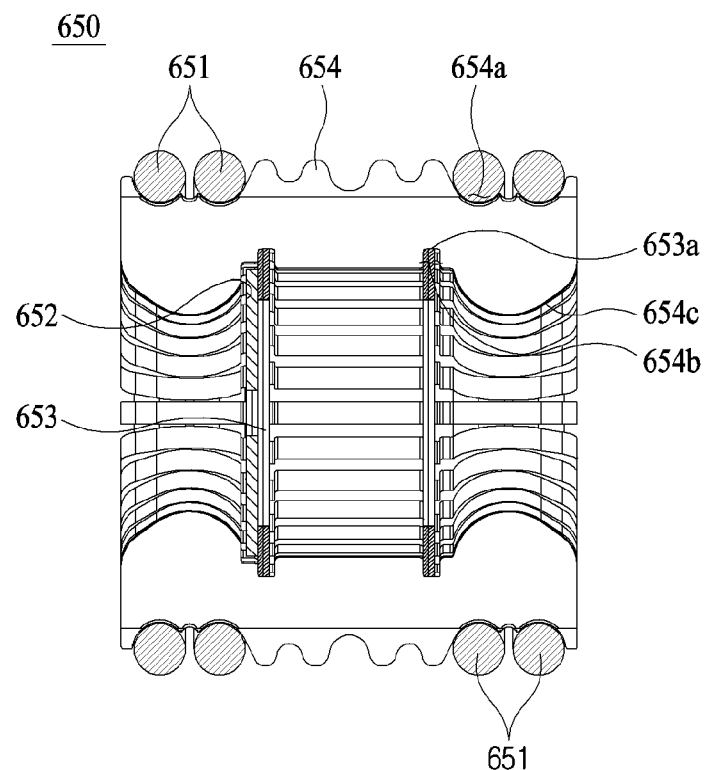
FIG. 12 is a side cross-sectional view of the tulip contactor of FIG. 10.
Figure 13:
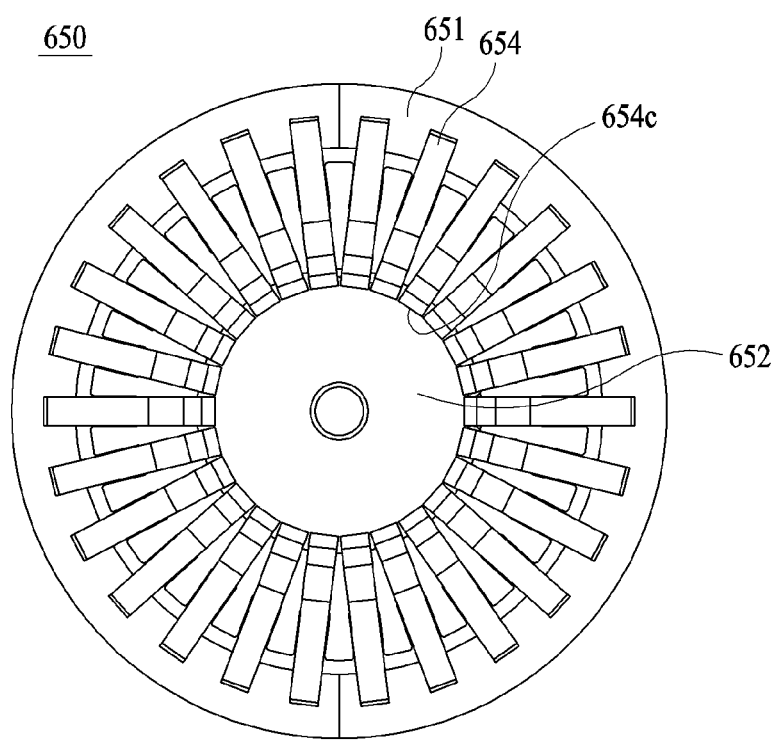
FIG. 13 is a front view of the tulip contactor of FIG. 10.
Figure 14:
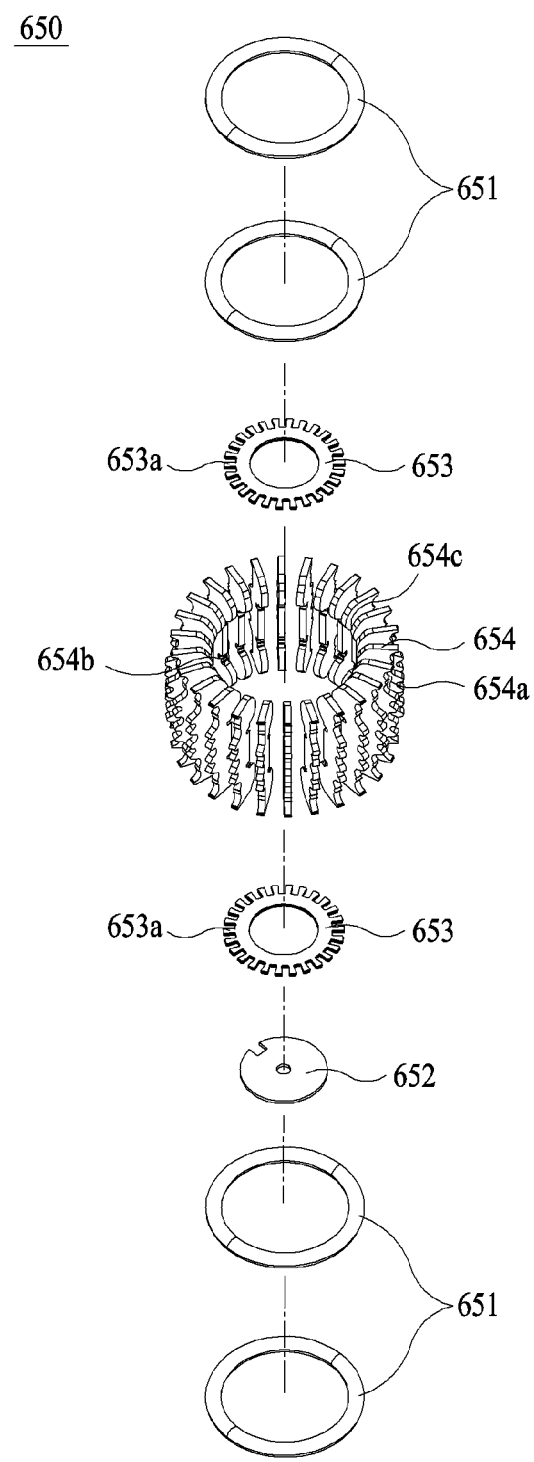
FIG. 14 is an exploded perspective view of the tulip contactor of FIG. 10.

Hereinafter, a vacuum circuit breaker 1 according to an embodiment of the present disclosure will be described in detail with reference to the drawings.

In the following description, descriptions of some components will be omitted to help understanding of the present disclosure.

In this specification, the same/like reference numerals are given to the same/like components even in different embodiments, and a redundant description thereof will be omitted.

The accompanying drawings are merely used to help easily understand the technical idea of the present disclosure and it should be understood that the idea of the present disclosure is not limited by the accompanying drawings.

A singular representation may include a plural representation unless it represents a definitely different meaning from the context.

Figure 15:
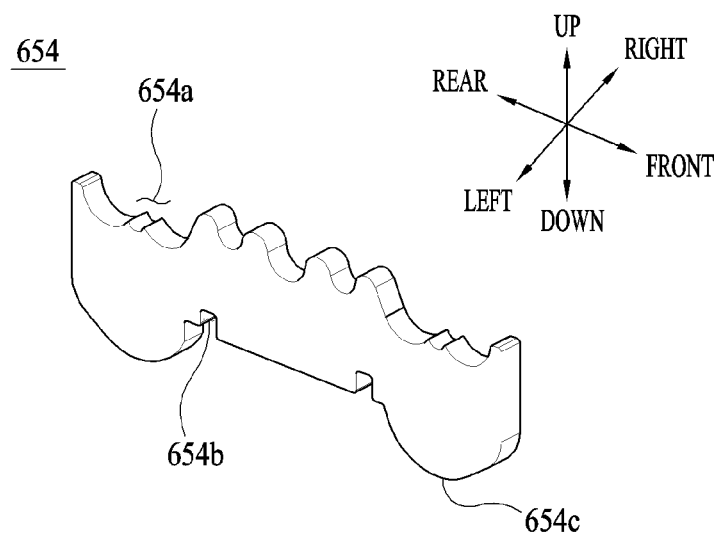
FIG. 15 is a perspective view of a tulip finger included in the tulip contactor of FIG. 10.
Figure 16:
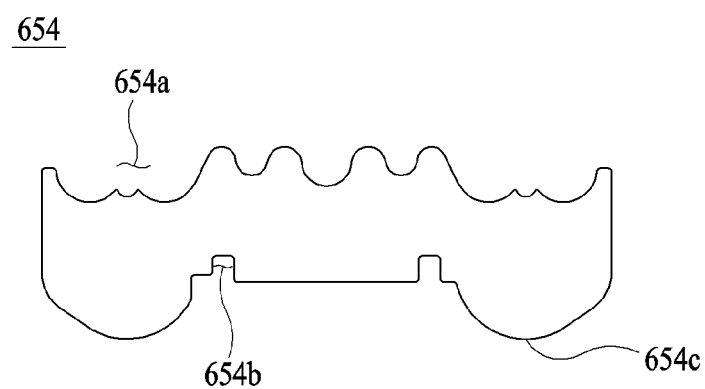
FIG. 16 is a side view of the tulip finger of FIG. 15.
Figure 17:
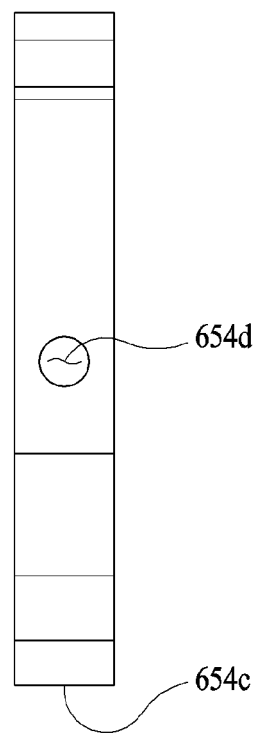
FIG. 17 is a rear view of the tulip finger of FIG. 15.
Figure 18:
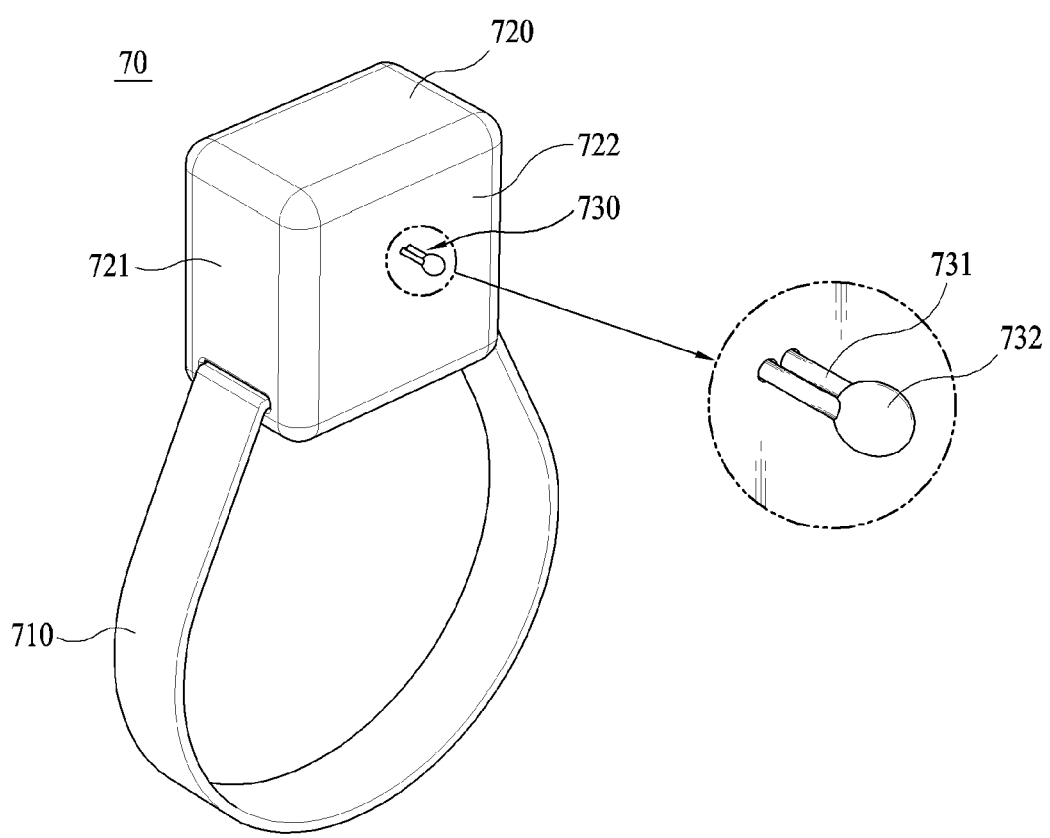
FIG. 18 is a perspective view of the temperature detecting sensor included in the vacuum circuit breaker of FIG. 1.
Figure 19:
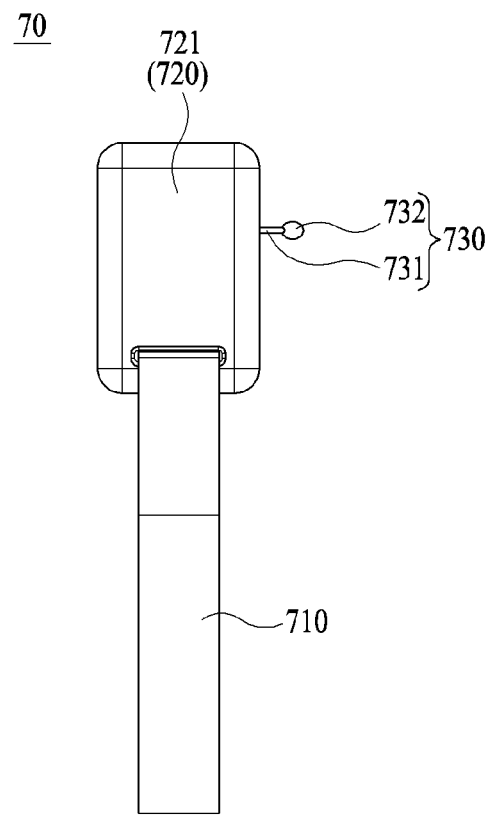
FIG. 19 is a side view of the temperature detecting sensor of FIG. 18.
Figure 20:
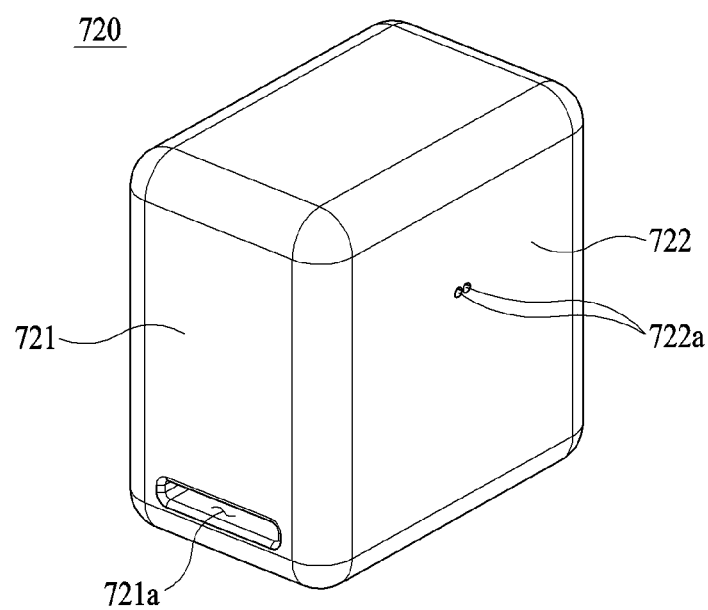
FIG. 20 is a perspective view of a sensor body included in the temperature detecting sensor of FIG. 18.
Figure 21:
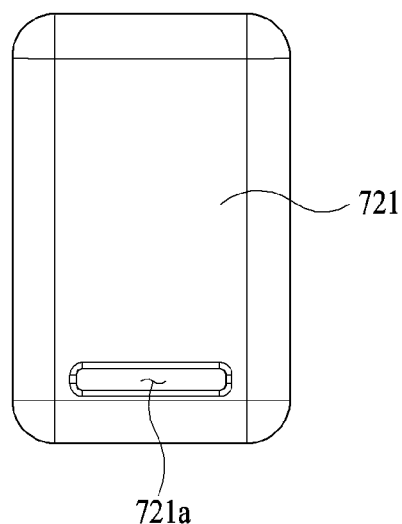
FIG. 21 is a side view of the sensor body of FIG. 20.
Figure 22:
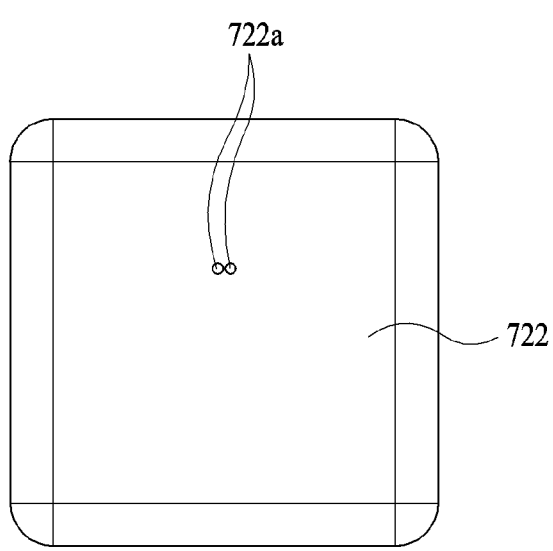
FIG. 22 is a front view of the sensor body of FIG. 20.
Figure 23:
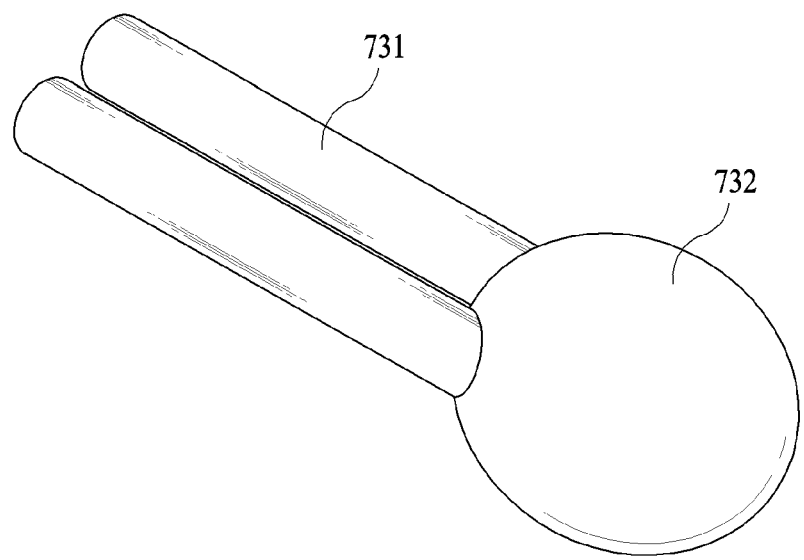
FIG. 23 is a perspective view of a temperature measurement part included in the temperature detecting sensor of FIG. 18.
Figure 24:
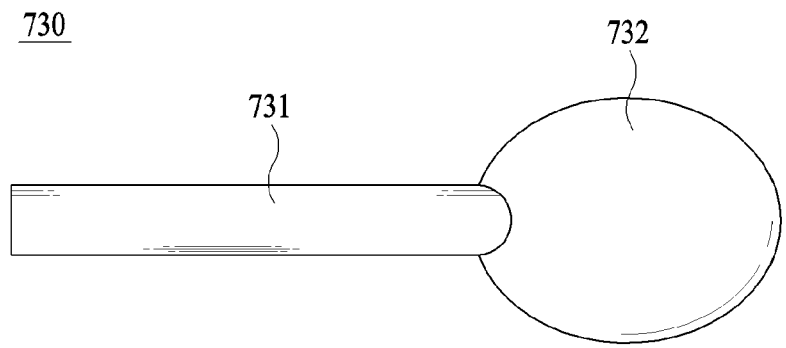
FIG. 24 is a side view of the temperature measurement part of FIG. 23.

The terms "upper," "lower," "left," "right,", "front," and "rear" used in the following description will be understood based on a coordinate system illustrated in FIGS. 1 and 15.

1. Description of the Vacuum Circuit Breaker 1 According to an Embodiment of the Present Disclosure Hereinafter, referring to FIGS. 1 to 17, the vacuum circuit breaker 1 according to an embodiment of the present disclosure will be described.

The vacuum circuit breaker 1 may allow or block a state of an electrical connection between an external power source and a load. To do so, the vacuum circuit breaker 1 is electrically connected to the external power source and the load. In other words, the external power source and the load may be electrically connected to each other by the vacuum circuit breaker 1.

When a fixed contact point and a movable contact point of the vacuum circuit breaker 1 are in contact with each other, the external power source may be electrically connected to the load via the vacuum circuit breaker 1. On the other hand, when a fixed contact point and a movable contact point of the vacuum circuit breaker 1 are apart from each other, a state of an electrical connection between the external power source and the load is blocked.

Referring to FIGS. 1 to 6, the vacuum circuit breaker 1 according to an embodiment of the present disclosure includes a frame unit 10, a mechanism assembly 20, a conductive pole 60, and a temperature detecting sensor 70.

Hereinafter, referring to the attached drawings, a configuration of the vacuum circuit breaker 1 according to an embodiment of the present disclosure will be described. The frame unit 10, the mechanism assembly 20, the conductive pole 60, and the temperature detecting sensor 70 will be described in a separate clause.

(1) Description of the Frame Unit 10

Hereinafter, referring to FIG. 1, the frame unit 10 is described.

The frame unit 10 forms an outer appearance of the vacuum circuit breaker 1. The frame unit 10 is a part in which the vacuum circuit breaker 1 is exposed to outside.

A space is provided in the frame unit 10. Various components configured to operate the vacuum circuit breaker 1 may be accommodated in the space. The various components may be surrounded by the frame unit 10 not to be exposed to outside.

In the illustrated embodiment, the mechanism assembly 20, the conductive pole 60, and the temperature detecting sensor 70 are accommodated in the space inside the frame unit 10.

In the illustrated embodiment, the frame unit 10 includes an upper frame 110 and a side frame 120.

The upper frame 110 is arranged at one side of the frame unit 10, i.e., at an upper side in the illustrated embodiment. The upper frame 110 is arranged to cover the space defined in the frame unit 10 from an upper side.

In the illustrated embodiment, the upper frame 110 is provided to have a rectangular plate shape in which an extending length in an anteroposterior direction is greater than an extending length in a left-and-right direction.

Edges of the upper frame 110 are respectively consecutive to the side frame 120.

The upper frame 110 may be provided in plurality. In this case, the plurality of upper frames 110 are spaced apart from each other.

The side frame 120 forms side surfaces of the frame unit 10, i.e., a left side, a right side, a front side, and a rear side of the frame unit 10 in the illustrated embodiment. The side frame 120 covers the space defined in the frame unit 10 from the left, right, front, and rear sides.

In the illustrated embodiment, the side frame 120 is provided to have a pillar shape extending in an upward-and-downward direction.

One edge of the side frame 120 in an extending direction is consecutive to the upper frame 110. In the illustrated embodiment, an upper edge of the side frame 120 is consecutive to the upper frame 110.

The side frame 120 may be provided in plurality. In this case, the plurality of side frames 120 are spaced apart from each other. In the illustrated embodiment, three side frames 120 are arranged in parallel with each other in a left-and-right direction.

A conductive pole insertion opening capable of accommodating the conductive pole 60 is provided in an outer circumference of the side frame 120.

In the illustrated embodiment, the conductive pole insertion opening for accommodating the conductive pole 60 is provided in an outer circumference surface of the side frame 120 at a front side.

The conductive pole insertion opening accommodates the conductive pole 60 to communicate with external and internal spaces of the side frame 120.

A space for accommodating the conductive pole 60 is defined inside the conductive pole insertion opening. That is, the conductive pole 60 is coupled through the conductive pole insertion opening.

The conductive pole insertion opening extends in a same direction as an extending direction of the conductive pole 60. In the illustrated embodiment, the conductive pole insertion opening extends in an anteroposterior direction.

The conductive pole insertion opening is arranged to surround the conductive pole 60. That is, the conductive pole 60 is surrounded by the conductive pole insertion opening.

The conductive pole insertion opening may be provided in plurality. A number of the conductive pole insertion openings is identical to a number of the conductive poles 60 coupled to the side frames 120.

(2) Description of the Mechanism Assembly 20

Hereinafter, referring to FIG. 1, the mechanism assembly 20 is described.

The mechanism assembly 20 controls the vacuum circuit breaker 1 to operate in a closed state or a trip state. The mechanism assembly 20 is manipulated to be rotated to provide a state of an electrical connection between the vacuum circuit breaker 1 and an external power source or a load, or block an electrical connection therebetween. The mechanism assembly 20 is accommodated in the space defined inside the frame unit 10. The mechanism assembly 20 may be operated to be rotated in the space.

The mechanism assembly 20 is connected to a link part and a spring part. The mechanism assembly 20 may be operated to be rotated with at least one of the link part and the spring part.

As the mechanism assembly 20 is operated, the link part may be rotated to operate the vacuum circuit breaker 1 in a closed state or trip state.

The link part is connected to the mechanism assembly 20. As components of the mechanism assembly 20 are rotated, the link part may be rotated along with the components.

The link part is rotatably coupled to the frame unit 10.

The link part converts linear movement of a main shaft connected to the mechanism assembly 20 in a horizontal direction into linear movement in a vertical direction relative to a ground surface.

One end of the link part is connected to a distal end of the main shaft. In addition, another end of the link part is coupled to the spring part.

As the link part is rotated, the spring part is linearly moved such that a vacuum interrupter (VI) fixed contact point and a VI movable contact point are brought into contact with or spaced apart from each other.

The spring part is connected to the link part. As the link part is rotated, the spring part may be linearly moved.

In addition, the spring part is connected to a vacuum interrupter (VI). In detail, the spring part is connected to the VI movable contact point. Accordingly, as the spring part is moved, the VI movable contact point is moved together.

The VI is accommodated in the space defined inside the frame unit 10 to allow or block current conduction. In detail, as the VI fixed contact point is brought in contact with the VI movable contact point, the VI allows current conduction, or as the VI fixed contact point is apart from the VI movable contact point, the VI blocks current conduction.

The VI is coupled to the spring part. As the spring part is moved, components of the VI may be brought into contact with each other or spaced apart from each other.

The VI includes the VI fixed contact point and the VI movable contact point.

The VI fixed contact point is electrically connected to the external power source or the load. The vacuum circuit breaker 1 may be electrically connected to the external power source or the load via the VI fixed contact point.

The VI fixed contact point is accommodated inside the side frame 120. That is, the VI fixed contact point is surrounded by the side frame 120.

As the VI fixed contact point is in contact with or apart from the VI movable contact point, an electrical connection between inside and outside of the vacuum circuit breaker 1 may be allowed or blocked.

The VI fixed contact point is not moved in the inner space of the frame unit 10. Accordingly, the VI fixed contact point may be brought into a contact with or spaced apart from the VI movable contact point by moving the VI movable contact point.

The VI movable contact point is electrically connected to the external power source or the load. In addition, the VI movable contact point is electrically connected to or separate from the VI fixed contact point.

The VI movable contact point is accommodated inside the side frame 120. That is, the VI movable contact point is surrounded by the side frame 120.

The VI movable contact point may be linearly moved, and be brought into contact with or spaced apart from the VI fixed contact point. In detail, the VI movable contact point may be moved in a direction toward or away from the VI fixed contact point.

When the VI movable contact point is moved in a direction toward the VI fixed contact point, the VI movable contact point and the VI fixed contact point come in contact with each other. In this case, an electrical connection between the external power source and the load may be allowed.

In addition, when the VI movable contact point is moved in a direction away from the VI fixed contact point, the VI movable contact point and the VI fixed contact point are spaced apart with each other. In this case, an electrical connection between the external power source and the load is blocked.

(3) Description of the Conductive Pole 60

Hereinafter, referring to FIGS. 1 to 17, the conductive pole 60 is described.

The conductive pole 60 electrically connects the VI to an external power source or a load. To do so, the conductive pole 60 is electrically connected to the VI and the external power source or the load.

The conductive pole 60 is coupled through one side of the side frame 120. In detail, the conductive pole 60 is coupled through the conductive pole insertion opening in the side frame 120.

The conductive pole 60 may be provided in plurality. In the illustrated embodiment, three pairs of conductive poles 60 are arranged in parallel with each other in a left-and-right direction.

A number of the conductive poles 60 may be determined according to a type of a power system including the vacuum circuit breaker 1 in the present disclosure. In one embodiment, the vacuum circuit breaker 1 is included in a power system using a circuit of three phases such as an R-phase, an S-phase, and a T-phase. Accordingly, three pairs of conductive poles 60 are included in accordance with the three-phase circuit.

In the illustrated embodiment, the conductive pole 60 includes a housing part 610, a plate part 620, a conductive pole terminal 630, a coupling member 640, and a tulip contactor 650.

The housing part 610 forms an outer appearance of the conductive pole 60. The housing part 610 is a part in which the conductive pole 60 is exposed to outside.

The housing part 610 is provided to have a cylindrical shape extending in one direction. In the illustrated embodiment, the housing part 610 is provided to have a cylindrical shape extending in an anteroposterior direction.

A hollow hole is provided in the housing part 610. Parts of the conductive pole terminal 630 and the tulip contactor 650 may be accommodated in the hollow hole. That is, parts of the conductive pole terminal 630 and the tulip contactor 650 are surrounded by the housing part 610.

The housing part 610 may be provided to include an insulating material. For example, the housing part 610 may be provided to include a synthetic resin material. Thus, an arbitrary electrical connection between inside and outside of the conductive pole 60 may be prevented.

The plate part 620 is a part in which the conductive pole 60 is directly coupled to the VI. In detail, the plate part 620 is electrically coupled to the VI.

The plate part 620 is provided to have a plate shape. In the illustrated embodiment, the plate part 620 is provided to have a rectangular plate shape in which an extending length in an anteroposterior direction is greater than an extending length in a left-and-right direction.

The plate part 620 may be provided to include a conductive material. For example, the plate part 620 may include copper (Cu), silver (Ag), etc.

In the illustrated embodiment, the plate part 620 is provided with a coupling hole.

The coupling hole is a space through which a member configured to couple the plate part 620 to the VI is inserted. The coupling hole may be provided in plurality.

The conductive pole terminal 630 is coupled to one end of the plate part 620. In the illustrated embodiment, the conductive pole terminal 630 is coupled to one end of the plate part 620 at a front side.

The conductive pole terminal 630 electrically connects the plate part 620 with the tulip contactor 650. To do so, the conductive pole terminal 630 is electrically coupled respectively to the plate part 620 and the tulip contactor 650.

The conductive pole terminal 630 is provided to have a plate shape extending in one direction. In the illustrated embodiment, the conductive pole terminal 630 is provided to have a plate shape extending in an anteroposterior direction. However, the conductive pole terminal 630 is not limited to the illustrated shape, and may be provided in various shapes.

The conductive pole terminal 630 is accommodated in the space defined inside the housing part 610. That is, the conductive pole terminal 630 is surrounded by the housing part 610.

One end of the conductive pole terminal 630 is coupled to the tulip contactor 650. In the illustrated embodiment, one end of the conductive pole terminal 630 at a front side is coupled to the tulip contactor 650.

The conductive pole terminal 630 is coupled to the tulip contactor 650 by the coupling member 640.

The coupling member 640 is arranged between the conductive pole terminal 630 and the tulip contactor 650 to be coupled respectively thereto. Accordingly, the conductive pole terminal 630 and the tulip contactor 650 may be securely coupled to each other.

The coupling member 640 is not limited to the illustrated shape, and may be provided in various shapes. In one embodiment, the coupling member 640 may be coupled to the conductive pole terminal 630 and the tulip contactor 650 by using a bolt-nut coupling method.

The coupling member 640 may be provided to include a highly rigid material. For example, the coupling member 640 may be provided to include a metal material.

The tulip contactor 650 is a part in which the vacuum circuit breaker 1 is in direct contact with a terminal of the external power source or the load.

The tulip contactor 650 is electrically connected to the terminal of the external power source or the load. Accordingly, electrical current may be supplied to the tulip contactor 650. When the electrical current is supplied to the tulip contactor 650, a magnetic field is generated in the tulip contactor 650. The generated magnetic field is transmitted to the temperature detecting sensor 70 through a fixing band 710 which is to be described later. This will be described in detail later.

In the illustrated embodiment, the tulip contactor 650 includes a fixing ring 651, a contactor plate 652, a saw-toothed ring 653, and a tulip finger 654.

The fixing ring 651 increases contact force between the tulip contactor 650 and the terminal of the external power source or the load.

The fixing ring 651 is positioned to surround an outer circumferential surface of the tulip finger 654. In detail, the fixing ring 651 is positioned in a fixing to ring coupling groove 654a in the tulip finger 654.

The fixing ring 651 is provided to have a ring shape. In the illustrated embodiment, a center of the fixing ring 651 is provided to be identical to a center of the tulip finger 654.

The fixing ring 651 supports the tulip finger 654 at a radially outer side, and prevents arbitrary deviation of the tulip finger 654.

In one embodiment, a diameter of the fixing ring 651 is provided to be smaller than an outer diameter of the tulip finger 654. Accordingly, contact force between the tulip finger 654 and the external terminal may increase.

The fixing ring 651 may be provided in plurality. In the illustrated embodiment, four fixing rings 651 are arranged in parallel with each other along an anteroposterior direction.

The contactor plate 652 and the saw-toothed ring 653 are positioned at a radially inner side of the fixing ring 651 and the tulip finger 654.

The contact plate is positioned to meet the terminal of the external power source or the load.

The contactor plate 652 is electrically connected to the conductive pole terminal 630 to electrically connect the external power source or the load with the conductive pole terminal 630.

The contactor plate 652 may have a plate shape. In the illustrated embodiment, the contactor plate 652 may be formed in a disk shape. However, the contactor plate 652 is not limited to the illustrated shape, and may be provided in various shapes. For example, the contactor plate 652 may have a ring shape.

The contactor plate 652 may be provided to include a conductive material. For example, the contactor plate 652 may include copper (Cu), silver (Ag), etc.

The saw-toothed ring 653 prevents twisting or movement of the tulip finger 654.

The saw-toothed ring 653 is positioned at a radially inner side of the tulip finger 654. In detail, the saw-toothed ring 653 is in contact with an inner circumferential surface of the tulip finger 654. Accordingly, the saw-toothed ring 653 may support the tulip finger 654 at a radially inner side.

The saw-toothed ring 653 may be provided to include a highly rigid material. For example, the saw-toothed ring 653 may include a metal material.

The saw-toothed ring 653 may be provided in plurality. In the illustrated embodiment, two saw-toothed rings 653 are arranged in parallel with each other along an anteroposterior direction.

The saw-toothed ring 653 is provided to have a ring shape in which a plurality of saw teeth 653a are provided on an outer circumferential surface. In this case, an inner diameter of the saw-toothed ring 653 is provided to be smaller than an inner diameter of the tulip finger 654.

A saw tooth 653a is provided to protrude toward a radially outer side of the saw-toothed ring 653.

The tulip finger 654 is coupled between two neighboring saw teeth 653a. In detail, a saw-tooth coupling groove 654b in the tulip finger 654 is coupled to be engaged with a recess portion between two neighboring saw teeth 653a.

In the illustrated embodiment, the saw tooth 653a is provided such that a quadrangle cross-section extends in an anteroposterior direction. However, the saw tooth 653a is not limited to the illustrated shape, and may be provided in various shapes. For example, the saw tooth 653a may be provided such that a triangular cross-section extends in one direction.

The saw tooth 653a may be provided in plurality. In this case, a number of the saw teeth 653a is provided to be identical to a number of tulip fingers 654.

The tulip finger 654 increases contact force between the terminal of the external power source or the load and the vacuum circuit breaker 1.

The tulip finger 654 may be provided in plurality. The plurality of tulip fingers 654 are arranged along a circumferential direction of a virtual circle. In the illustrated embodiment, the tulip fingers 654 are all provided to have a same shape.

The fixing ring 651 is coupled to a radially outer side of the tulip finger 654. In addition, the contactor plate 652 and the saw-toothed ring 653 are coupled to each other at a radially inner side of the tulip finger 654. In summary, the radially outer side of the tulip finger 654 is supported by the fixing ring 651, and the radially inner side thereof is supported by the contactor plate 652 and the saw-toothed ring 653.

The tulip finger 654 is provided to have a plate shape extending in one direction. In the illustrated embodiment, the tulip finger 654 extends in an anteroposterior direction.

In the illustrated embodiment, the fixing ring coupling groove 654a is arranged in an upper side of the tulip finger 654, the saw-tooth coupling groove 654b and a terminal contact part 654c are provided at a lower side thereof, and a sensor insertion hole 654d is provided at a rear side thereof.

The fixing ring coupling groove 654a prevents the fixing ring 651 from being arbitrarily deviated from a coupling point.

The fixing ring coupling groove 654a is arranged adjacent to the fixing ring 651. In detail, the fixing ring coupling groove 654a is in contact with an inner circumferential surface of the fixing ring 651.

The fixing ring coupling groove 654a is provided to be downwardly recessed from an upper side surface of the tulip finger 654.

The fixing ring coupling groove 654a is provided to have a shape corresponding to an inner circumference of the fixing ring 651.

The fixing ring coupling groove 654a may be provided in plurality. In this case, a number of the fixing ring coupling grooves 654a is provided to be identical to a number of the fixing rings 651. In the illustrated embodiment, four fixing ring coupling grooves 654a are arranged in parallel with each other along an anteroposterior direction.

The saw-tooth coupling groove 654b secures coupling between the saw-toothed ring 653 and the tulip finger 654. To do so, the saw-toothed coupling groove 654b is coupled to be engaged with the saw-toothed ring 653.

The saw-toothed coupling groove 654b is arranged adjacent to the saw tooth 653a of the saw-toothed ring 653. In detail, the saw-toothed coupling groove 654b is in contact with a recess portion provided between two neighboring saw teeth 653a.

The saw-toothed coupling groove 654b is provided to be upwardly recessed from a lower side surface of the tulip finger 654.

The saw-toothed coupling groove 654b is provided to have a shape corresponding to the saw tooth 653a.

The saw-toothed coupling groove 654b may be provided in plurality. In this case, a number of the saw-toothed coupling grooves 654b is provided to be identical to a number of the saw-toothed rings 653. In the illustrated embodiment, two saw-toothed coupling grooves 654b are arranged in parallel with each other in an anteroposterior direction.

The terminal contact part 654c is a part in direct contact with an outer circumferential surface of the external terminal.

The terminal contact part 654c is arranged adjacent to an outer circumferential surface of the external terminal. In addition, the terminal contact part 654c supports the external terminal at a radially outer side.

The terminal contact part 654c is provided to downwardly protrude from a lower side surface of the tulip finger 654.

In the illustrated embodiment, the terminal contact part 654c is provided to protrude to have a rounded shape. In detail, the terminal contact part 654c is provided to protrude to have a semi-circular shape.

The terminal contact part 654c may be provided in plurality. In the illustrated embodiment, two terminal contact parts 654c in total are provided at both ends at a front side and a rear side of the tulip finger 654, respectively.

The sensor insertion hole 654d is a part in which the tulip finger 654 is directly coupled to the temperature detecting sensor 70. In detail, the sensor insertion hole 654d is coupled to be engaged with the temperature measurement part 730.

The sensor insertion hole 654d is arranged adjacent to the temperature detecting sensor 70. In detail, the sensor insertion hole 654d is arranged to surround a part of the temperature detecting sensor 70.

The sensor insertion hole 654d is recessedly provided in one surface of the tulip finger 654 facing the temperature detecting sensor 70. In the illustrated embodiment, the sensor insertion hole 654d is recessedly provided from a rear surface of the tulip finger 654 toward a front side.

The sensor insertion hole 654d is provided to have a shape corresponding to a target contact part 732 of the temperature measurement part 730 which is to be described later.

2. Description of the Temperature Detecting Sensor 70 According to an Embodiment of the Present Disclosure Hereinafter, referring to FIGS. 18 to 24, the temperature detecting sensor 70 according to an embodiment of the present disclosure will be described.

The temperature detecting sensor 70 measures and monitors temperature of a specific point of the vacuum circuit breaker 1.

The temperature detecting sensor 70 is accommodated in the space defined inside the frame unit 10. In addition, the temperature detecting sensor 70 is accommodated in the space defined inside the housing part 610 of the conductive pole 60.

The temperature detecting sensor 70 is arranged adjacent to the tulip contactor 650. In detail, the temperature detecting sensor 70 is arranged adjacent to one surface of the tulip contactor 654.

The temperature detecting sensor 70 may be coupled to the conductive pole 60 to measure temperature of a specific point of the conductive pole 60.

In the illustrated embodiment, the temperature detecting sensor 70 includes a fixing band 710, a sensor body 720, and the temperature measurement part 730.

The fixing band 710 fixes the sensor body 720 to the conductive pole 60. In the illustrated embodiment, the fixing band 710 fixes the sensor body 720 to the coupling member 640 of the conductive pole 60.

The fixing band 710 is arranged to surround the coupling member 640. An inner circumference of the fixing band 710 is arranged to be in contact with an outer circumference of the coupling member 640. In one embodiment, an inner diameter of the fixing band 710 may be provided to be identical to an outer diameter of the coupling member 640.

In one embodiment, the fixing band 710 may pass through a band hole 721a in the sensor body 720. That is, the fixing band 710 may be coupled through the sensor body 720. Accordingly, it is desirable to provide a cross-sectional area of the fixing band 710 to be smaller than that of the band hole 721a.

In another embodiment, Velcros may be provided on an outer circumference of the fixing band 710 and one surface of the sensor body 720 facing the fixing band 710, respectively. Accordingly, the Velcros provided on the fixing band 710 and the sensor body 720 may be coupled to be engaged with each other.

In the illustrated embodiment, the fixing band 710 may be formed in a ring shape. However, the fixing band 710 is not limited to the illustrated shape, and may be provided in various shapes.

In addition, the fixing band 710 functions as a passage of a magnetic field generated in the tulip contactor 650. In one embodiment, the magnetic field generated in the tulip contactor 650 is transmitted to the fixing band 710 through the coupling member 640.

In one embodiment, the fixing band 710 may be provided to include a flexible conductive material. For example, the fixing band 710 may include a metal material.

The fixing band 710 may be provided in plurality. For example, two fixing bands 710 may be provided.

The sensor body 720 processes temperature data collected from the temperature measurement part 730 and transmits processed data to outside of the vacuum circuit breaker.

The sensor body 720 is arranged adjacent to the tulip contactor 650 of the conductive pole 60. In detail, the sensor body 720 is arranged adjacent to an outer circumference of the tulip contactor 654.

In addition, the sensor body 720 is coupled to the tulip contactor 650. In this case, the sensor body 720 is coupled to the coupling member 640 of the conductive pole 60 by the fixing band 710. In addition, the fixing band 710 tightly couples the sensor body 720 to the tulip contactor 650.

The temperature measurement part 730 is coupled to one side of the sensor body 720. In the illustrated embodiment, the temperature measurement part 730 is coupled to a front side of the sensor body 720.

A space for accommodating various components is defined in the sensor body 720. A power unit, an input unit, a data processing unit, and a communication unit may be included in the space.

In the illustrated embodiment, the sensor body 720 is divided into a body side surface portion 721 and a body front surface portion 722.

The body side surface portion 721 and the body front surface portion 722 form boundaries at left and right sides and a front side of the sensor body 720, respectively.

The body side surface portion 721 extends from ends of the left and right sides of the body front surface portion 722 toward a rear side. That is, the body side surface portion 721 is consecutive to a left or right end of the body front surface portion 722.

A band hole 721a is provided in the body side surface portion 721.

The band hole 721a is a space through which the fixing band 710 is coupled. To do so, it is desirable to provide a cross-sectional area of the band hole 721a to be greater than that of the fixing band 710.

The band hole 721a is provided in one side of the sensor body 720 and another side arranged in a position opposite to the one side of the sensor body 720.

In the illustrated embodiment, the band hole 721a is provided such that an oval cross-section extends in a left-and-right direction. However, the band hole 721a is not limited to the illustrated shape, and may be provided in various shapes. For example, the band hole 621a may be provided such that a polygonal cross-section extends.

The band hole 721a may be provided in plurality. In this case, a number of the band holes 721a is provided to be identical to a number of the fixing bands 710.

A connection line insertion hole 722a is provided in the body front surface portion 722.

The connection line insertion hole 722a is a space through which a connection line 731 is coupled. To do so, it is desirable to provide a cross-sectional area of the connection line insertion hole 722a to be greater than that of the connection line 731.

In the illustrated embodiment, the connection line insertion hole 722a is provided such that a round cross-section extends. However, the connection line insertion hole 722a is not limited to the illustrated shape, and may be provided in various shapes. For example, the connection line insertion hole 722a may be provided such that a polygonal cross-section extends.

A single or a plurality of connection line insertion holes 722a may be provided. In this case, a number of the connection line insertion holes 722a is provided to be identical to a number of connection lines 731.

The temperature measurement part 730 is a part by which the temperature detecting sensor 70 directly measures temperature.

The temperature measurement part 730 is fixed to be in contact with a specific point of which temperature is to be measured. In the illustrated embodiment, the temperature measurement part 730 may be in contact with the tulip finger 654 to measure temperature of the tulip finger 654.

A part of the temperature measurement part 730 may be accommodated in a sensor insertion hole 654d of the tulip finger 654.

The temperature measurement part 730 is coupled to the sensor body 720. In an embodiment, the temperature measurement part 730 transmits temperature data to an input unit equipped in the sensor body 720.

The temperature measurement part 730 may be provided in plurality.

In the illustrated embodiment, the temperature measurement part 730 includes the connection line 731 and a target contact part 732.

The connection line 731 is arranged between the target contact part 732 and the sensor body 720, and coupled respectively to the target contact part 732 and the sensor body 720. Accordingly, temperature data collected by the target contact unit 732 may be transmitted to the sensor body 720. To do so, the connection line 731 is electrically connected respectively to the target contact part 732 and the sensor body 720.

In one embodiment, the connection line 731 is connected to the input unit in the sensor body 720. The input unit collects temperature data via the connection line 731 and transmits the temperature data to the data processing unit.

The connection line 731 is provided as a line extending in one direction. In the illustrated embodiment, the connection line 731 extends in an anteroposterior direction.

A part of the connection line 731 may be accommodated in an inner space of the sensor body 720. In the embodiment, the connection line 731 passes through the connection line insertion hole 722a to be coupled through the sensor body 720.

The connection line 731 may be provided as a highly flexible material. For example, the connection line 731 may include a conductive polymer material. Thus, the connection line 731 may flexibly cope with movement of the tulip finger 654.

The connection line 731 may be provided in plurality. In this case, the respective connection lines 731 are spaced apart from each other and may measure temperature of different points.

The target contact part 732 is coupled to one side of the connection line 731 arranged in a position opposite to the sensor body 720.

The target contact part 732 is a part by which the temperature measurement part 730 directly collects temperature.

Temperature data collected by the target contact part 732 is processed by the sensor body 720 and transmitted to outside of the vacuum circuit breaker.

The target contact part 732 is arranged adjacent to a specific point of which temperature is to be measured. In detail, the target contact part 732 is arranged adjacent to the sensor insertion hole 654d in the tulip finger 654.

The target contact part 732 is arranged to be surrounded by the sensor insertion hole 654d of the tulip finger 654. That is, the target contact part 732 is accommodated in the sensor insertion hole 654d.

The connection line 731 is coupled to one side of the target contact part 732 arranged in a position opposite to the specific point.

In the illustrated embodiment, the target contact part 732 may be formed in a spherical shape. However, the target contact part 732 is not limited to the illustrated shape, and may be provided in various shapes. For example, the target contact part 732 may have a cylindrical shape.

In one embodiment, the target contact part 732 is provided to have a shape corresponding to the sensor insertion hole 654d.

The target contact part 732 may be provided in plurality. In this case, the connection line 731 is connected to each of the target contact parts 732.

The temperature detecting sensor 70 may further include a power unit, an input unit, a data processing unit, and a communication unit.

In one embodiment, the power unit, the input unit, the data processing unit, and the communication unit may be accommodated in a space defined in the sensor body 720.

The power unit provides a power source to operate the temperature detecting sensor 70. In detail, the power unit supplies electric energy transmitted by the fixing band 710 as a power source of the temperature detecting sensor 70. To do so, the power unit receives a magnetic field generated from the tulip contactor 650 via the fixing band 710.

The input unit collects temperature data measured by the target contact part 732 and transmits the temperature data to the data processing unit.

The data processing unit arranges data transmitted from the input unit, and then, transmits the data to the communication unit.

The communication unit transmits the data transmitted from the data processing unit to outside of the vacuum circuit breaker 1. A user may check the data transmitted by the communication unit to measure and monitor temperature of the vacuum circuit breaker 1.

While the present disclosure has been explained with reference to embodiments, the present disclosure is not limited to the configurations of the embodiments described above.

In addition, various changes and modifications may be made by those skilled in the art without departing from the spirit and scope of the present disclosure as defined by the appended claims.

Further, a part or whole of the respective embodiments may be selectively combined and configured such that various modifications thereof can be made.

The invention claimed is:

1. A vacuum circuit breaker comprising:
   a conductive pole comprising a tulip contactor electrically connected to an external power source or a load; and
   a temperature detecting sensor arranged adjacent to the tulip contactor,
   wherein the temperature detecting sensor comprises:
   a sensor body having an input unit accommodated therein;
   a fixing band coupled to the sensor body and arranged to surround a part of the conductive pole; and
   a temperature measurement part which is in contact with a specific point of the tulip contactor and configured to measure temperature of the specific point,
   wherein a sensor insertion hole for accommodating a part of the temperature measurement part is recessedly provided in one surface of the tulip contactor facing the sensor body.

2. The vacuum circuit breaker of claim 1, wherein the tulip contactor is provided to have a plate shape extending in one direction and comprises a plurality of tulip fingers arranged along a circumferential direction of a virtual circle, and
   at least one of the plurality of tulip fingers is provided with the sensor insertion hole in one surface facing the sensor body.

3. The vacuum circuit breaker of claim 1, wherein the temperature detecting part comprises:
   a connection line having one end coupled to the sensor body; and
   a target contact part accommodated in the sensor insertion hole and coupled to another end of the connection line arranged opposite to the one end of the connection line.

4. The vacuum circuit breaker of claim 3, wherein the target contact part is provided to have a shape corresponding to the sensor insertion hole.

5. The vacuum circuit breaker of claim 3, wherein the connection line is provided to comprise a conductive polymer material.

6. The vacuum circuit breaker of claim 3, wherein the target contact part is provided in plurality, and
   the plurality of target contact parts are coupled to different connection lines, respectively.

7. The vacuum circuit breaker of claim 1, wherein the temperature detecting sensor comprises a power unit configured to provide a power source and equipped in the sensor body.

8. The vacuum circuit breaker of claim 7, wherein the fixing band is provided to comprise a metal material, and
   the power unit is electrically connected to the fixing band and receives, via the fixing band, a magnetic field generated from the tulip contactor to generate electrical energy.

9. The vacuum circuit breaker of claim 1, wherein the fixing band passes through a band hole provided in the sensor body to be coupled to the sensor body.

10. The vacuum circuit breaker of claim 1, wherein Velcros are provided on an outer circumference of the fixing band and one surface of the sensor body facing the fixing band, respectively, to be coupled to be engaged with each other.

11. The vacuum circuit breaker of claim 1, wherein the input unit collects temperature data from the temperature measurement part, and
  the temperature detecting sensor comprises a data processing unit configured to receive the temperature data from the input unit and organize the temperature data.

12. The vacuum circuit breaker of claim 11, wherein the temperature detecting sensor comprises a communication unit configured to transmit, to outside, data organized by the data processing unit.

* * * * *